N. P. AKIN.
Improvement in the Manufacture of Sulphurous Acid.
No. 127,008. Patented May 21, 1872.
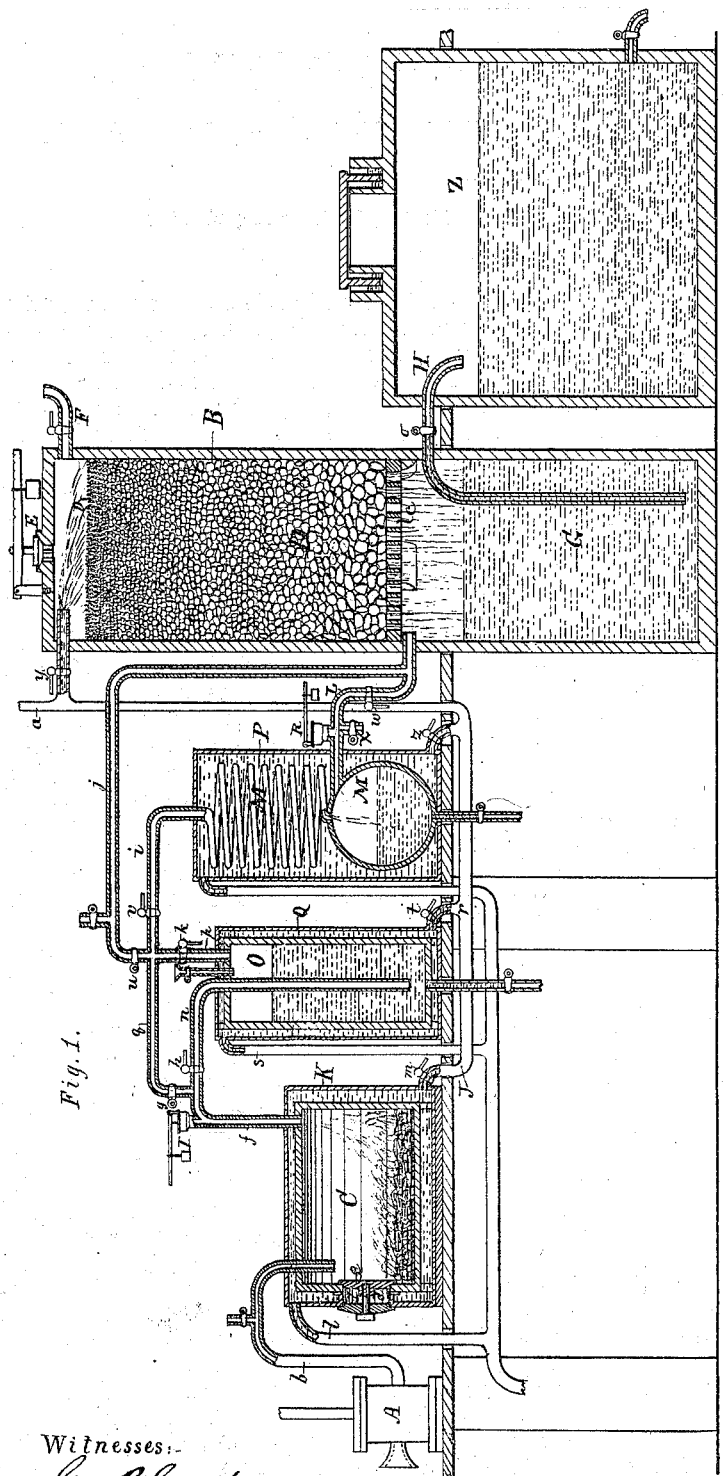
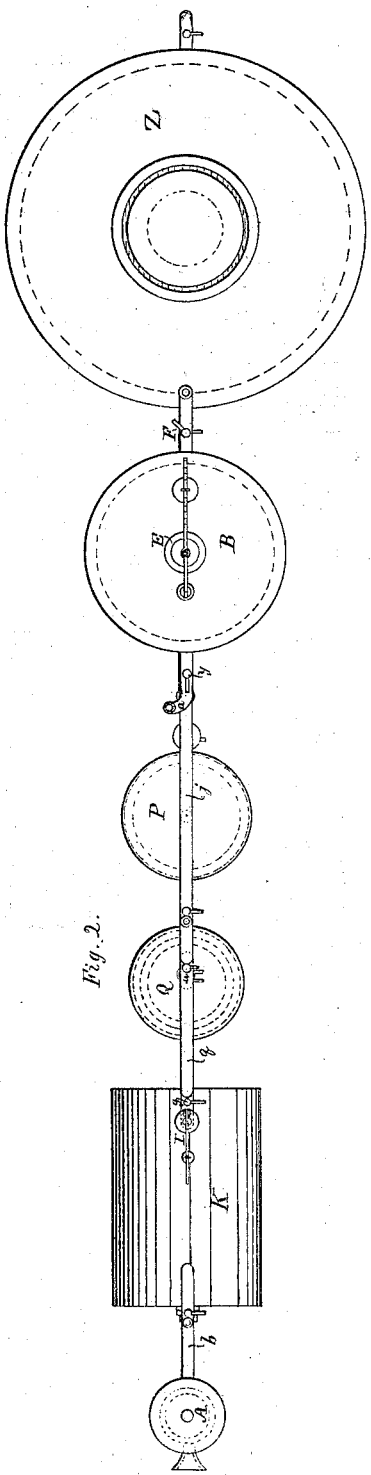

UNITED STATES PATENT OFFICE.

NELSON P. AKIN, OF PHILMONT, NEW YORK.

IMPROVEMENT IN THE MANUFACTURE OF SULPHUROUS ACID.

Specification forming part of Letters Patent No. 127,008, dated May 21, 1872.

SPECIFICATION.

*To all whom it may concern:*

Be it known that I, NELSON P. AKIN, of Philmont, in the county of Columbia and State of New York, have invented certain Improvements in the Manufacture of Sulphurous Acid, of which the following is a specification, reference being had to the accompanying drawing, in which—

Figure 1 is a sectional elevation, and Fig. 2 a plan, of an apparatus for use in carrying out my invention, like parts being marked by similar letters in both figures.

The distinguishing features of my invention are as follows, viz.: The burning of the sulphur or pyrites in a chamber in which a gaseous pressure, high above that of the atmosphere, is artificially produced and maintained substantially as hereinafter described; the preventing or lessening of the volatilization of sulphur when the sulphur or pyrites is burned in a chamber under high gaseous pressure, by means of a regulated current of water passing through a chamber surrounding the said chamber of combustion, as hereinafter set forth; the separation of volatilized sulphur or arsenic from the gaseous products of the combustion of sulphur or pyrites, by passing such vapors and gases through a washing-chamber surrounded by a chamber through which a regulated current of water is passed, as hereinafter described; in producing an aqueous solution of sulphurous acid, the passing of an artificially-compressed current of the mixed gases which result from the burning of sulphur or pyrites through a bed or column of siliceous pebbles or their equivalent, wet by water, in a chamber or tower in which a high gaseous pressure is artificially produced and maintained, substantially as hereinafter specified; the improved process of producing an aqueous solution of sulphurous acid by burning sulphur or pyrites under artificial gaseous pressure, forcing the gaseous products of such combustion through a bed or column of pebbles or their equivalent, wet by water, in a chamber or tower having an outlet-passage or passages for the insoluble gases, substantially as hereinafter described; the process of producing liquid sulphurous acid by burning sulphur or pyrites under high artificial gaseous pressure in a chamber, and by such pressure forcing the gaseous products of such combustion into a condenser in which a high gaseous pressure is maintained, substantially as hereinafter described; the simultaneous production of liquid sulphurous acid and an aqueous solution of sulphurous acid, in the manner hereinafter described.

In the aforesaid drawing, A is a cylinder of a force-pump, by which a current of compressed air is forced through the pipe $b$ into the chamber C, in which the sulphur or pyrites is burned. At $d$, in the chamber C, is an aperture or manhole, covered by a door or plate, $e$, which can be readily opened and closed, and through which the sulphur or pyrites is introduced into the chamber and ignited therein. The chamber C is constructed so as to withstand a high internal pressure, and is closed tight when in use, except at the inlet-pipe $b$ and outlet-pipe $f$. The combustion of the sulphur or pyrites in the chamber C is supported by the air which is forced into that chamber by the pump A, and the capacity and power of the pump is so great, and the escape-passage $f$ is so small, or so controlled by a cock or cocks, $g\ h$, that the gaseous pressure in every part of the chamber C is easily maintained high above the external atmospheric pressure. I is a safety-valve, to limit the pressure in the chamber C.

The advantage derived from thus burning the sulphur or copper pyrites or iron pyrites under a high artificial pressure—or from one to fifty or more pounds per square inch above that of the atmosphere—is, that the sulphur or pyrites burns faster and unites with the oxygen of the compressed air with greater avidity, so that a larger portion of the oxygen of the air combines with the sulphur to form sulphurous-acid gas, and less of the oxygen of the air passes off free or uncombined with the sulphur than would be the case if, as I believe has been heretofore proposed, the sulphur or pyrites was burned in a chamber into and through which the air was drawn by the draught or suction of a chimney, fan, or pump, or blown or forced by a fan, pump, or bellows, with a free discharge for the gaseous products of the combustion, so that the sulphur or pyrites was burned under even somewhat less, or but very little or no greater, pressure than that of the external atmosphere.

When the sulphur or pyrites is burned under a high pressure, as above specified, heat is more rapidly evolved by the more intense combustion, and the chamber of combustion thereby becomes more rapidly and highly heated, and, consequently, the sulphur is more liable to be vaporized without being converted into sulphurous acid than when the sulphur or pyrites is burned under little or no greater pressure than that of the atmosphere. To counteract that difficulty, I surround the combustion-chamber, wholly or in part, by a close chamber, through which a regulated current of water is made to pass. J is a pipe, by which the water is admitted into the chamber K around the chamber C, and the water is let out of the chamber K by the pipe $l$. By means of a cock, $m$, in the pipe J, the quantity of water passing into the chamber K can be regulated so as to keep the chamber C at the proper temperature—neither too cool nor too hot to secure the best result. When the cock $g$ is closed and the cock $h$ is open, the gases evolved in the chamber C pass through the pipes $f$ and $n$ into the lower part of the washing-chamber O, which is partly filled with water, and has a discharge-pipe, $p$, at its top, and is surrounded by a close chamber, Q, into which water is admitted through a pipe, $r$, and discharged therefrom by a pipe, $s$. By means of a cock, $t$, in the pipe $r$, the quantity of water admitted into the chamber Q can be regulated so as to keep the washing-chamber O at such a temperature that the vaporized sulphur and arsenic will be condensed and detained therein without having the sulphurous acid liquefied in that chamber.

B is a close tower or chamber, capable of withstanding internal pressure high above that of the external atmosphere, and having a perforated partition or grate, $c$, upon which rests a bed or column, D, of siliceous pebbles or pieces of coke, or broken earthenware, or other solid substances which present a large surface and are not acted upon by sulphurous acid and water. A jet or spray of water is showered upon the top of the bed or column D from a pipe, $a$, furnished with a cock, $y$, by which the quantity of water admitted can be nicely regulated. E is a safety-valve, and F is a blow-off cock in the upper part of the chamber B. When the cocks $g$, $v$, and $w$ are closed and the cocks $h$, $k$, and $u$ are open, the mixed gases are forced from the combustion-chamber C, by reason of the higher pressure therein, through the washer O, and thence through the pipes $p$ and $j$ into the chamber B, and just below the grate $c$ therein. As the mixed gases pass up through the interstices between the pebbles or their equivalent in the bed or column D, the sulphurous-acid gas is absorbed by the water dripping and spreading down over the surfaces of the pebbles or their equivalent, while the nitrogen and insoluble gases pass to the top and escape through the blow-off cock F or safety-valve E, and the aqueous solution of sulphurous acid drips down through the grate $c$ into a receptacle, G, in the lower part of the chamber or tower. H is a pipe, furnished with a cock, $o$, by which the solution of sulphurous acid is discharged into a tank, Z. When the cocks $h$ and $v$ are closed, and the cocks $g$ and $u$ are open, the mixed gases of combustion are, by the pressure in the chamber C, forced therefrom through the pipes $f$, $q$, and $j$, into the tower or chamber B, without passing through the washer O; and the pressure in the chamber B can be maintained high above that of the external atmosphere, and at various degrees below the pressure in the chamber C, by means of the blow-off cock F, safety-valve E, and a cock or cocks in the passage or passages leading from the chamber C into the chamber B. By maintaining the pressure in the chamber B high above that of the external atmosphere, the water absorbs the sulphurous-acid gas from the mixed gases with far greater energy and rapidity, and a much stronger solution of the sulphurous acid is produced than if the pressure in the chamber B was no greater or less than the external atmospheric pressure. In case the sulphur or pyrites shall be burned in an ordinary sulphur-burning or pyrites-burning furnace, as heretofore practiced, the desired high gaseous pressure in the solution-tower B can be secured by the use of a suitable pump in the passage, by which the mixed gases of such combustion shall be conducted from the furnace into the solution-tower. When the cocks $g$ and $u$ are closed and the cocks $h$, $k$, and $v$ are open, the gases are forced from the chamber C through the washer O, and thence through the pipes $p$ and $i$ into a worm-condenser, M, in a chamber, P, through which a current of cool water is passed. When the cocks $h$, $k$, and $u$ are closed and the cocks $g$ and $v$ are open, the gases will then pass from the chamber C through the pipes $f$, $q$, and $i$ into the condenser M. The escape of the gases from the condenser M is controlled by a safety-valve, R, a blow-off cock, $x$, or a pipe, L, having a cock, $w$, and extending into the chamber B. When the sulphur or pyrites is burned under a pressure of fifty pounds or more to the inch in the chamber C, the pressure can be thereby kept so high in the condenser M that when the latter is kept cool by the water-chamber P the sulphurous-acid gas in the mixed gases of the combustion will be mostly condensed into a liquid and remain in the chamber M, while the unliquefied gases will escape under high pressure through the cock $x$ or safety-valve R, or will pass through the pipe L into the chamber B, wherein the remaining sulphurous-acid gas, if any, will be absorbed by the water descending through the pebbles D or their equivalent, and thus produce an aqueous solution of sulphurous acid simultaneously with the production of liquid sulphurous-acid in the condenser M.

In my above-described process of producing liquid sulphurous acid or an aqueous solution of sulphurous acid, or both, under high gaseous pressure, as illustrated by the aforesaid drawing, an important practical advantage is secured by not having the force-pump, which produces such high pressure, exposed to the destroying action of the sulphurous acid and gases evolved from the burning sulphur or pyrites.

I believe that it has been heretofore proposed to burn sulphur or pyrites, to produce sulphurous-acid gas, in a chamber having inlet and outlet apertures, and to support the combustion in such chamber by air passed into it by means of a blower, pump, fan, or bellows. That I do not claim; but I am not aware that in any such case the gaseous pressure in every part of the combustion-chamber would be maintained high above or even as much as one pound per square inch in excess of the external atmospheric pressure. I also believe that it has been heretofore proposed to produce an aqueous solution of sulphurous acid by passing the mixed gases, which result from the burning of sulphur or pyrites up through a tower filled with small pieces of coke wet by water at the top. That process I do not claim; but I am not aware that in thus producing an aqueous solution of sulphurous acid the pressure of the gases in the solution-tower was ever heretofore maintained substantially in excess of the external atmospheric pressure, nor that the mixed gases were, prior to my invention, forced into and through such a tower, in the manufacture of an aqueous solution of sulphurous acid, by the artificial gaseous pressure in the furnace or chamber in which the sulphur or pyrites was burned.

I am aware that it has been proposed to produce liquid sulphurous acid by forcing, by means of a pump, the mixed gases which result from the burning of sulphur or pyrites into a condensing-chamber in which a high pressure was to be maintained, while the unliquefied gases were allowed to escape through a blow-off cock or safety-valve; and I do not claim that process; but I do not know or believe that liquid sulphurous acid was ever heretofore manufactured by burning sulphur or pyrites in a chamber in which a high artificial pressure was maintained, as hereinbefore described, and by reason of such high pressure in the combustion-chamber forcing the gases of such combustion into a chamber in which a pressure sufficient to liquefy the sulphurous-acid gas was sustained while the other gases escaped.

What I claim as my invention, and desire to secure by Letters Patent, is—

1. In producing sulphurous acid, the burning of the sulphur or pyrites in a chamber which is supplied with an artificially-compressed current of atmospheric air, as described, when, by reason of the character of the escape passage or passages for the gaseous products of such combustion, the pressure in every part of said combustion-chamber is substantially more than one pound per square inch in excess of the external atmospheric pressure.

2. In burning sulphur or pyrites in a chamber, C, in which the artificial gaseous pressure is kept high above that of the external atmosphere, as described, the preventing or lessening of the volatilization of sulphur by means of a regulated current of water passing through a chamber, K, around the said combustion-chamber, as set forth.

3. The separation of vaporized sulphur or arsenic from the gaseous products of the combustion of sulphur or pyrites by passing the said gases through a washing-chamber, O, surrounded by a chamber, Q, through which a regulated current of water is passed, as herein described.

4. In producing an aqueous solution of sulphurous acid, the passing of an artificially-compressed current of the mixed gases which result from the combustion of sulphur or pyrites, through a bed or column of siliceous pebbles, D, or their equivalent, wet by water in a tower or chamber, B, in which a gaseous pressure high above the external atmospheric pressure is artificially maintained, as described.

5. The improved process of producing an aqueous solution of sulphurous acid by burning sulphur or pyrites under artificial gaseous pressure in a chamber, C, as described, and, by such pressure, forcing the gaseous products of such combustion through a bed or column of siliceous pebbles, or the equivalent thereof, wet by water in a tower or chamber, B, having an escape passage or passages for the insoluble gases, as set forth.

6. The improved process of producing liquid sulphurous acid by burning sulphur or pyrites under high pressure in a chamber, C, as herein described, and by such high pressure in the combustion-chamber forcing the gaseous products of such combustion into a condenser, M, in which a high gaseous pressure is artificially maintained, as herein set forth.

7. The improved process of simultaneously producing liquid sulphurous acid, and an aqueous solution of sulphurous acid, by burning sulphur or pyrites in a chamber, C, under high gaseous pressure, as described, and by such pressure forcing the gaseous products of such combustion into a condenser, M, in which a high pressure is maintained, as specified, and passing the unliquefied gases from said condenser through a bed or column of siliceous pebbles, or their equivalent, wet by water in a chamber or tower, B, having an escape passage or passages for the insoluble gases, as set forth.

NELSON P. AKIN.

Witnesses:
GEO. P. LAWSON,
AUSTIN F. PARK.